United States Patent [19]
Sparks et al.

[11] 4,367,000
[45] Jan. 4, 1983

[54] DISPLAY APPARATUS

[76] Inventors: Robert J. Sparks, 1412 E. 15th; Ronald S. Nichka, 1521 N. 1st Ave., both of Upland, Calif. 91786

[21] Appl. No.: 159,831

[22] Filed: Jun. 16, 1980

[51] Int. Cl.³ .................... A47B 81/06; F16B 12/00
[52] U.S. Cl. .................................. 312/249; 312/10; 312/107; 312/234; 312/351
[58] Field of Search .............. 312/107, 111, 257 SK, 312/257 A, 250, 249, 200, 201, 202, 9, 10; 211/186, 188, 40

[56] References Cited

U.S. PATENT DOCUMENTS

| | | | |
|---|---|---|---|
| 193,339 | 7/1877 | Lothrop | 312/107 |
| 715,967 | 12/1902 | Briggs | 312/351 |
| 1,565,993 | 12/1925 | Fitzpatrick | 312/107 |
| 2,115,239 | 4/1938 | Strain | 312/196 |
| 2,206,103 | 7/1940 | Michael | 312/200 |
| 2,602,252 | 7/1952 | Shinn | 312/234 |
| 2,875,010 | 2/1959 | Sola et al. | 312/200 |
| 3,080,203 | 3/1963 | Graham | 312/10 |
| 3,185,307 | 5/1965 | Higgins | 312/107 |
| 3,219,400 | 11/1965 | Bergquist | 312/107 |
| 3,353,888 | 11/1967 | Pritelli, Jr. | 312/111 |
| 3,408,128 | 10/1968 | Kump | 312/234 |
| 3,552,817 | 1/1971 | Marcolongo | 312/111 |
| 3,666,337 | 5/1972 | Sztorc | 312/10 |
| 3,905,662 | 9/1975 | Richmond | 312/201 |
| 3,997,220 | 12/1976 | Mayer | 312/234 |
| 4,128,175 | 12/1978 | Schweizer | 312/9 |

FOREIGN PATENT DOCUMENTS 2811535  9/1978  Fed. Rep. of Germany .......... 312/9

Primary Examiner—Victor N. Sakran

[57] ABSTRACT

A modular display apparatus having at least one module which includes at least four elongated first members which are disposed in generally parallel spaced relationship. Two of the first members intersect a first plane along substantially the entire axial extent thereof. Two other of the first members intersect a second plane along substantially the entire extent thereof. The first and second planes are spaced. Four elongated second members are disposed in generally parallel relationship. Two of the second members are disposed in generally perpendicular relationship to two other of the first members and intersect the first plane along substantially the entire axial extent thereof. Two other of the second members are disposed in generally perpendicular relationship to two other of the first members and intersect the second plane along substantially the entire axial extent thereof. Each of the first members and each of the second members have a first slot disposed in a third plane which is generally perpendicular to the first and second planes. Each of the first and second members include a second slot which is disposed in a fourth plane which is disposed in generally perpendicular relationship to the first and second planes. A first generally planar member is carried in the first slots of the first and second elongated members, and a second generally planar member is carried in the second slots of the first and second elongated members.

13 Claims, 11 Drawing Figures

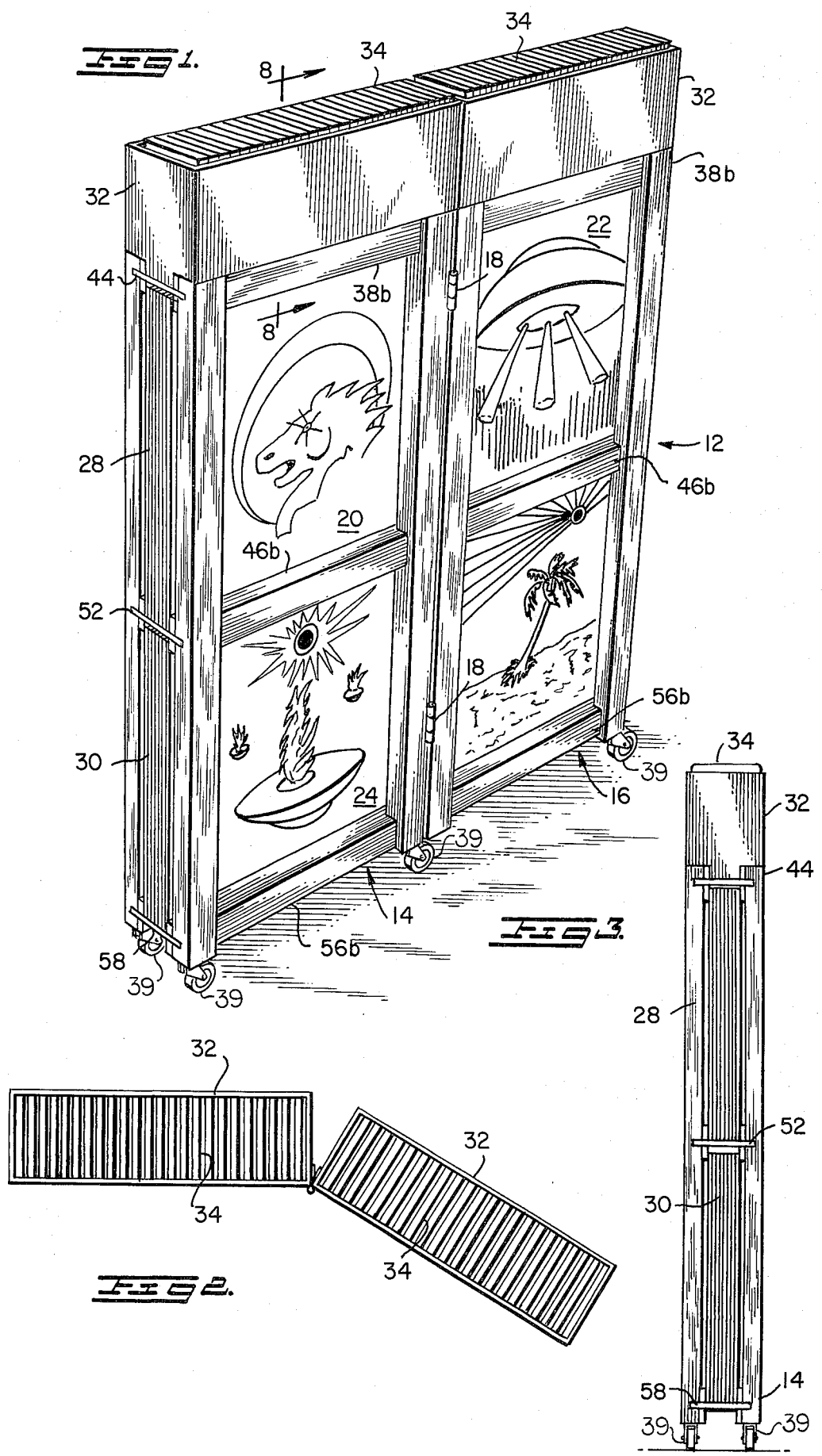

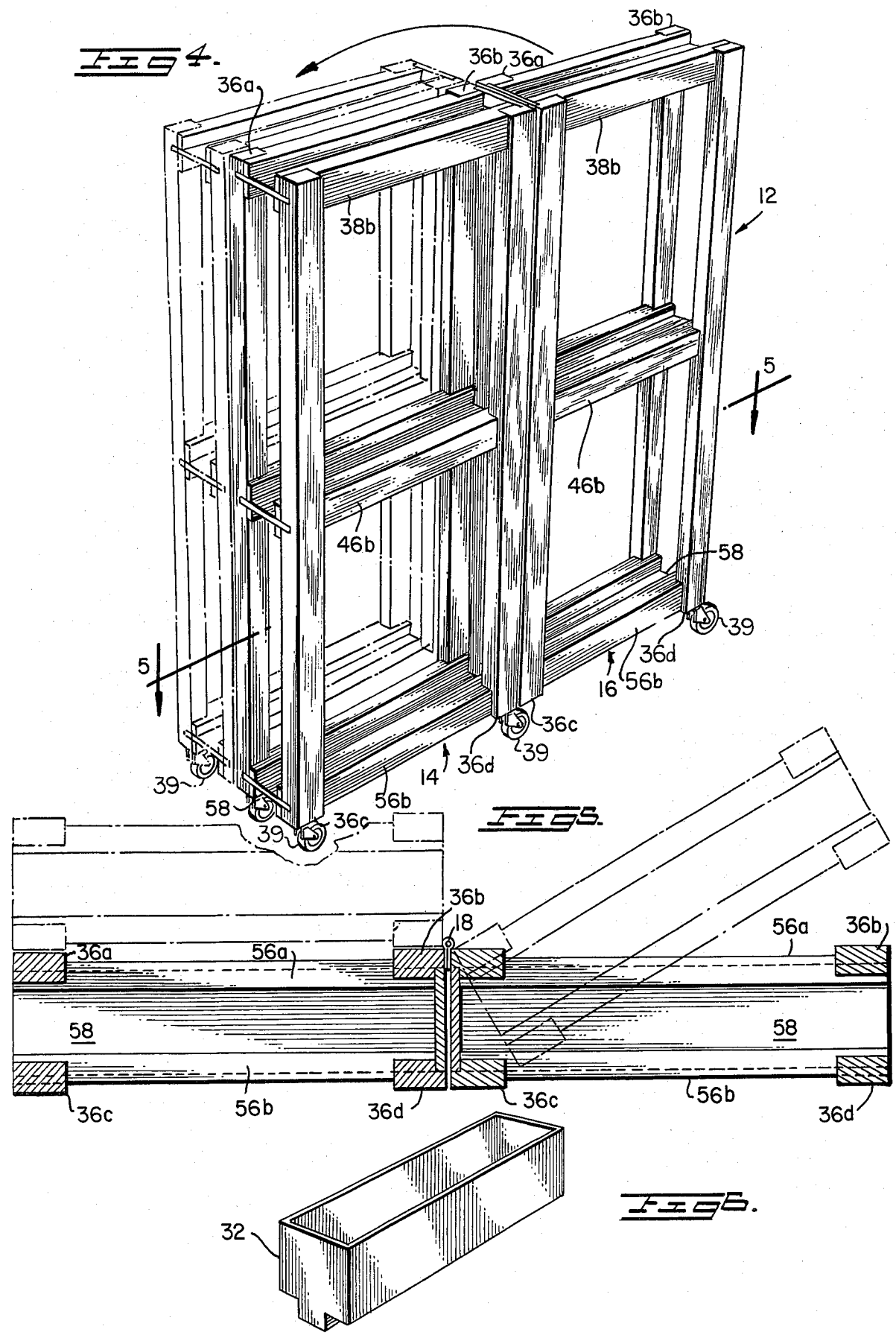

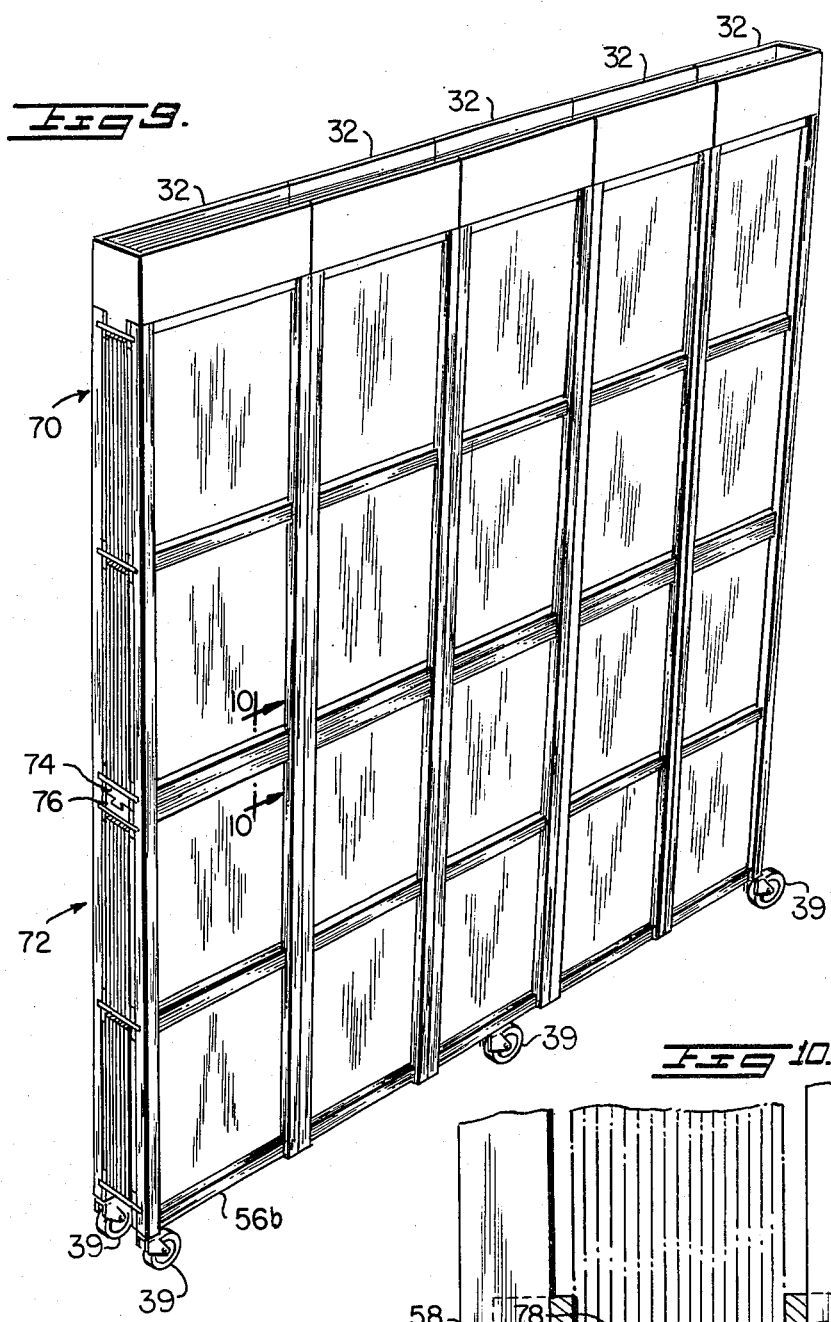
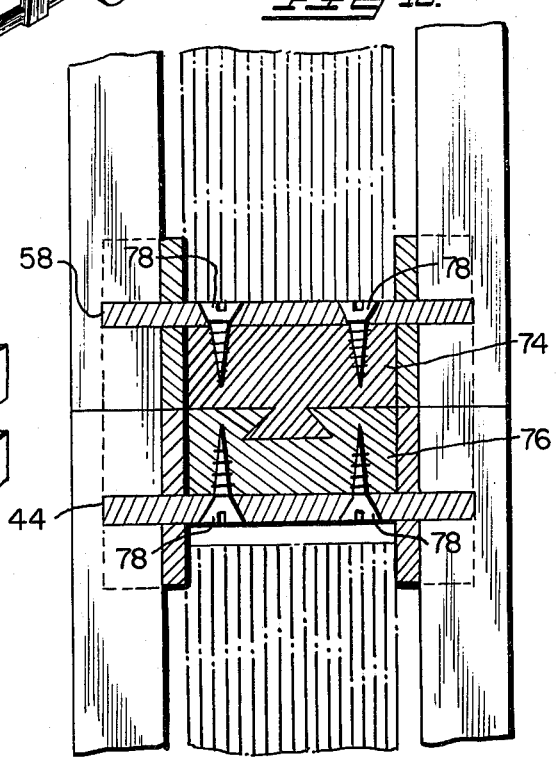
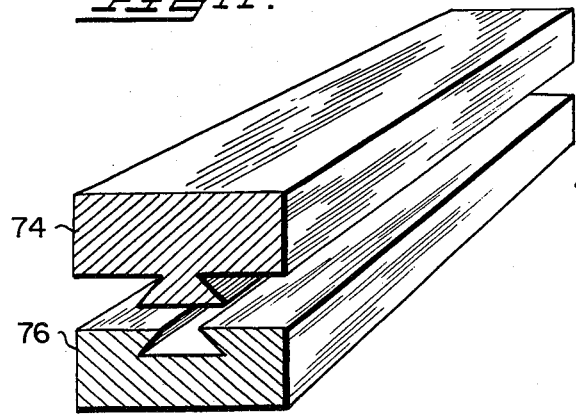

DISPLAY APPARATUS

BACKGROUND OF THE INVENTION

The invention relates to display apparatus and particularly to such apparatus which is suitable for displaying phonograph records as well as the newer so called video discs which carry information for cooperation with various apparatus to produce a video display. Various forms of the apparatus also will be used with cassettes and cartridges which have a magnetic tape media disposed therein. It will be understood that while the invention has primary application to such objects that it will also have application to the storage and display of other objects.

The various prior art apparatus for storing recorded media and the like has in general not capitalized on the aesthetic appeal of the art work which is customarily utilized on the containers for such objects. Lack of sufficient care in the storage of such products has often resulted in damage resulting from either warping or from excessive weight on the sides of the object. Very commonly such objects have not been stored in an orderly manner which lends itself to rapidly retrieving a desired record. Other known apparatus has not been readily expandable to accommodate additional records as the storage requirement grows.

It is a primary object of the invention to provide apparatus which will facilitate the display of the artistic images disposed on the wrapping of recorded media.

It is another object of the invention to provide apparatus which makes it easy to retrieve an individual record either for changing the display or for use of the record.

Another object of the invention is to provide apparatus which is itself aesthetically appealing.

Another object of the invention is to provide apparatus which will prevent warping or other damage to the recorded media.

Another object of the invention is to provide apparatus which facilitates the storage of the recorded media in an organized manner.

Another object of the invention is to provide apparatus which is simple and inexpensive to manufacture.

Yet another object of the invention is to provide apparatus which is expandable with the aquisition of additional recorded media.

Still another object is to provide apparatus which may be easily moved either for cleaning or for rearranging room decoration.

SUMMARY OF THE INVENTION

The foregoing objects and other objects and advantages which shall become apparent from the detailed description of the preferred embodiment are attained in a modular display apparatus which includes at least one module which includes at least four elongated first members which are disposed in generally parallel spaced relationship. Two of the first members intersect a first plane along substantially the entire axial extent thereof. Two other of the first members intersect a second plane along substantially the entire extent thereof. The first and second planes are spaced. Four elongated second members are disposed in generally parallel relationship. Two of the second members are disposed in generally perpendicular relationship to two of the first members and intersect the first plane along substantially the entire axial extent thereof. Two other of the second members are disposed in generally perpendicular relationship to two other of the first members and intersect the second plane along substantially the entire axial extent thereof. Each of the first members and each of the second members have a first slot disposed in a third plane which is generally perpendicular to the first and second planes. Each of said first and second members include a second slot which is disposed in a fourth plane which is disposed in generally perpendicular relationship to the first and second planes. A first generally planar member is carried in the first slots of the first and second elongated members, and a second generally planar member is carried in the second slot of the first and second elongated members.

The second elongated members may be step shaped and have a dimension at the axial extremities measured in a direction parallel to the third and fourth planes which is smaller than the axial portions thereof intermediate the axial extremities. The first slots may extend completely through the axial extremities of the second elongated members. The second slots may extend completely through the axial extremities of the second elongated members. The apparatus may further include a second module which includes at least four elongated first members which are disposed in generally parallel spaced relationship. Two of the first members may intersect at first plane along substantially the entire axial extent thereof. Two other of the first members may intersect a second plane along substantially the entire extent thereof. The first and second planes may be spaced. Four elongated second members may be disposed in generally parallel relationship with two of the second members being disposed in generally perpendicular relationship to two of the first members and intersecting the first plane along substantially the entire axial extent thereof. Two other of the second members may be disposed in generally perpendicular relationship to two other of the first members and intersect the second plane along substantially the entire axial extent thereof. Each of the first members and each of the second members may have a first slot disposed in a third plane which is generally perpendicular to the first and second planes. Each of the first and second members include a second slot which is disposed in a fourth plane which is disposed in generally perpendicular relationship to the first and second planes. A first generally planar member may be carried in the first slots of the first and second elongated members; and a second generally planar member may be carried in the second slots of the first and second elongated members.

The second elongated members in the second module are step shaped and have a dimension at the axial extremities measured in a direction parallel to the third and fourth planes which is smaller than the axial portions thereof intermediate the axial extremities. The first slots in the second module may extend completely through the axial extremities of the second elongated members. The second slots of the second module may extend completely through the axial extremities of the second elongated members.

The first and second modules may be joined by cooperating elongated first and second surfaces disposed respectively on the first and second modules. The first surface may be a tongue and the second surface may be a groove dimensioned for engagement with the tongue. The first and second modules may be hinged together by at least one hinge having a hinge pin having an axis which is disposed in generally parallel relationship to the first and second planes of the first module.

The apparatus in accordance with another form of the invention may include at least one module which includes at least first and second display chambers. Each chamber is dimensioned and configured for accommodating a plurality of associated generally planar generally square packages for disc shaped recording media. All packages disposed in each display chamber are disposed in registered relationship relative to each other (that is the sides of each package are aligned with the sides of each other package and one package does not extend beyond the edge of any other package). The first and second chambers are disposed with at least one face of one of the packages in each chamber being generally coplanar.

The apparatus in the second embodiment may further include a second module which includes at least first and second display chambers. Each chamber is dimensioned and configured for accommodating a plurality of associated generally planar generally square packages for disc shaped recording media, all packages disposed in each display chamber being in registered relationship relative to each other.

The first and second modules may be joined by cooperating elongated first and second surfaces disposed respectively on the first and second modules. The first surface may be a tongue and the second surface may be a groove dimensioned for engagement with the tongue. The first and second modules may be hinged together by at least one hinge having a hinge pin having an axis which is disposed in generally parallel relationship to one side of the first module. The apparatus may also include means for holding magnetic tape cartridges or cassettes carried on the upper surface of the apparatus.

Caster means may be mounted on the lower extremity of the apparatus to facilitate movement.

BRIEF DESCRIPTION OF THE ACCOMPANYING DRAWING

FIG. 1 is a perspective view of a first embodiment of the invention having two sections;

FIG. 2 is a top view of the first embodiment with the relative orientation of the two sections changed and which illustrates the manner of storage of cassettes in this embodiment;

FIG. 3 is a side view of the apparatus in FIG. 1;

FIG. 4 is another perspective view of the first embodiment which is hinged for movement about an axis extending through a vertical plane;

FIG. 5 is a sectional view taken along the line 5—5 of FIG. 4;

FIG. 6 is a perspective view of the closure member shown in FIG. 1 with the cassettes removed;

FIG. 9 is a perspective view of a second embodiment of the apparatus in accordance with the invention;

FIG. 10 is a sectional view taken along the line 10—10 of FIG. 9; and

FIG. 11 is a perspective view to an enlarged scale of a portion of the embodiment of FIGS. 9 and 10.

DESCRIPTION OF THE PREFERRED EMBODIMENT

Figure 7:
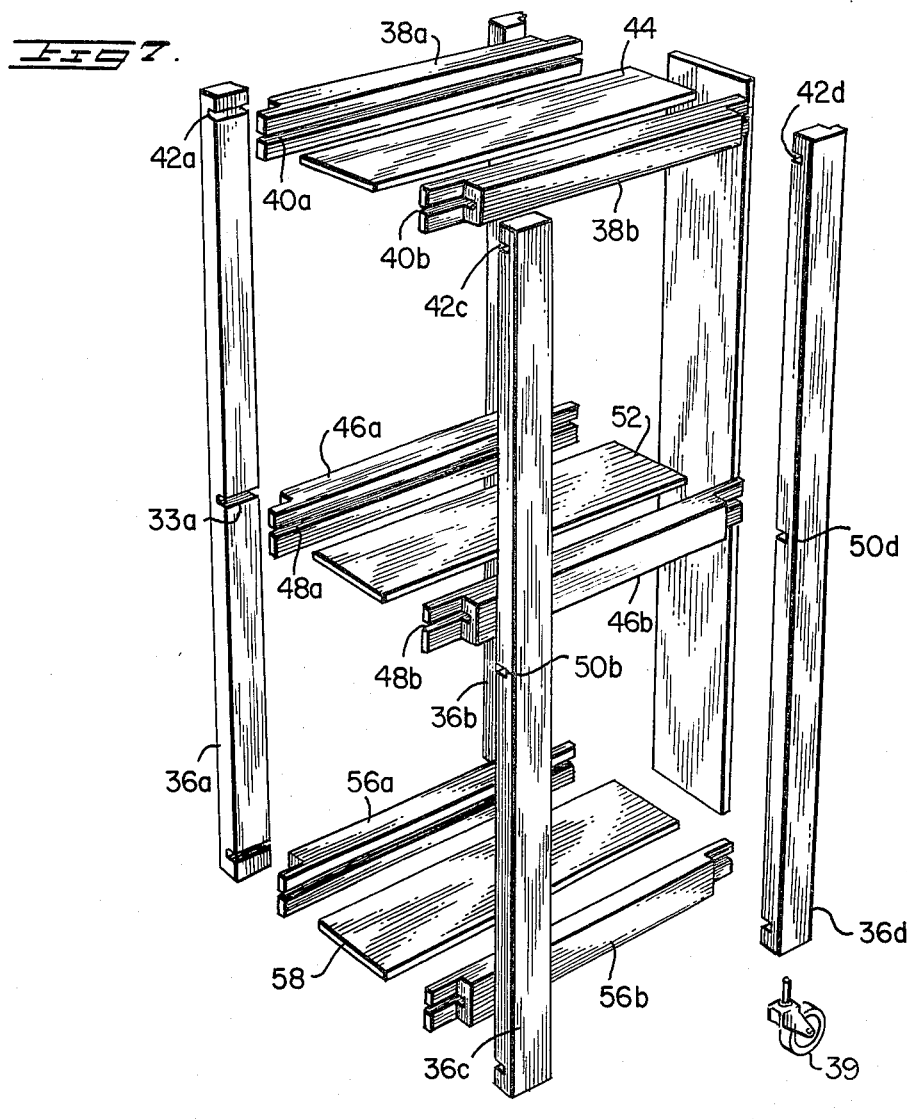
FIG. 7 is a simplified exploded perspective view of a portion of the first embodiment.

Referring now to FIGS. 1-8 there is shown a display and storage apparatus 12 in accordance with the invention. The assembly includes first and second modules or sections, 14 and 16, which in the illustrated embodiment, are joined together by hinges 18, 18 which are disposed with hinge pins disposed with a generally vertical orientation. Phonograph record albums 20, 24 are carried within the module 14 and albums 22, 26 are carried with the module 16. Reference numerals 28, 30 identify a plurality of other additional record albums which are also carried within the module 14. Closure members 32, which engage the upper extremity of the modules 14, 16, each carry a plurality of 8 track cartridges or cassettes which are collectively identified by the numerals 34, 34.

Figure 8:
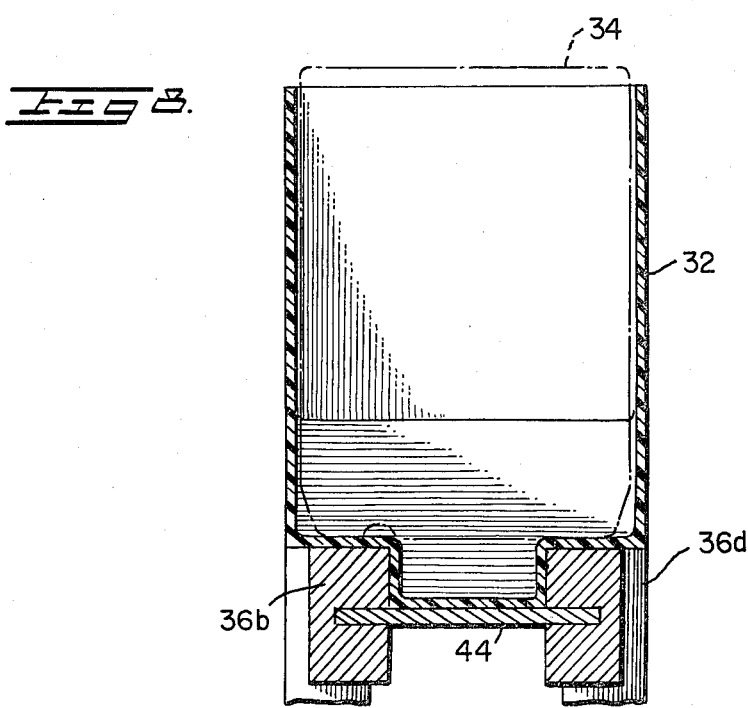
FIG. 8 is a sectional view of taken through the lines 8—8 of FIG. 1.

Referring now also to FIGS. 7 and 8 there are shown additional views of a module such as 14, 16 which comprises four elongated first members 36a, 36b, 36c, and 36d. Elongated first members 36c and 36d are disposed with substantially the entire axial extent thereof extending through an imaginary first plane (not shown) and first elongated members 36a and 36b are disposed with substantially the entire axial extent thereof intersecting an imaginary second plane (not shown). Second elongated members 38a and 38b are disposed with substantially the entire axial extent thereof within a third plane (not shown) which is generally perpendicular to the first and second planes. The second elongated members 38a and 38b are provided with slots respectively identified by numerals 40a and 40b. These slots extend completely through the axial extremities of the second elongated members 38a and 38b. It will be understood that in addition to slots 40a and 40b extend along the entire axial extent of the members 38a and 38b. Disposed in generally coplanar relationship with the slots 40a and 40b are slots 42a, 42c, and 42d. In a similar manner a slot is provided in the first elongated member 36b which is generally coplanar with the slots 42a, 42c, and 42d. It will be seen that the second elongated members 38a and 38b have a step shaped contour as best shown in FIG. 7. A generally planar member 44 is disposed in engaged relationship with each of the slots 42a, 42b, 42c, 42d as well as the slots 40a and 40b.

In the same general manner the second elongated members 46a and 46b are provided with slots respectively identified by the numerals 48a and 48b and first elongated members 36a, 36b, 36c, and 36d are provided respectively with slots 50a, 50b, and 50d (50c not shown). A generally planar member 52 engages each of the slots 48a, 48b, 50a, 50b, 50c, and 50d. It will be understood that the generally planar member 52 is disposed in generally parallel relationship to the generally planar member 44.

In a very similar manner, the second elongated members 56a and 56b are provided with slots as are first elongated members 36a, 36b, 36c, and 36d to cooperate with a third generally planar member 58.

The closure member 32 may be manufactured of plastic and as best seen in FIG. 8 may have a step shaped outline which engages the second elongated members 36b and 36d as well as the first planar member 44.

As best seen in FIGS. 4 and 5 the hinges 18 allow rotation of module 16 with respect to module 14 to a closed position wherein the modules 14, 16 are disposed in essentially overlapping relationship. Alternatively the modules 14 and 16 may be rotated to a position where the modules are disposed in substantially a coplanar relationship. In some forms of the invention the apparatus may include casters 39. The casters 39 may be either ball shaped casters or wheel shaped elements.

Referring now to the embodiment of FIGS. 9, 10 and 11 there is shown a second embodiment of the apparatus in accordance with the invention which includes upper and lower units 70, 72 which are joined along a horizontal plane by tongue and groove elongated members 74, 76 which are fastened by wood screws 78 to irrespectively generally planar members 58 and 44. It will be understood that the unit 70 comprises five modules which are substantially the same as the modules 14 or 16. Similarly the unit 72 comprises five modules which are substantially identical with the modules 14 and 16. In some forms of the apparatus illustrated in FIG. 8 a single elongated tongue shaped member 74 may extend for the entire width of the assembly and a single elongated groove shaped member 76 will similarly extend the entire width of the assembly. In these embodiments of the invention the vertical arrays will not fold relative to each other. In still other embodiments of the invention the vertical arrays extending from a closure member 32 down to the second member 56b may be hinged to the adjacent vertical array.

As also shown in FIG. 5, the embodiment illustrated in FIG. 9 includes casters 39. Additional support (not shown) for the casters 39 may include a planar member extending in a generally normal relationship to the recording media packages 75 (illustrated in FIG. 9).

In various embodiments of the invention the dimensions intermediate the generally planar members may be varied to accommodate objects of different sizes. For example, the generally planar members 52 and 58 may be spaced apart a distance that is suitable for accommodating a plurality of 8 track tapes or cassettes intermediate the second members 56a and 56b as well as between second members 46a and 46b. The materials which may be used for construction of the apparatus include wood, plastic, or metal although wood is particularly desirable for the aesthetic appeal particularly in pine, oak or mahogany.

It will be seen that the apparatus in accordance with the invention facilitates the display of aesthetically attractive covers of records and the like and that it also facilitates the easy change of a display. Similarly it will be understood that the apparatus facilitates the storage of records and the like in a manner which will avoid damage due to warping or other causes. It will further be seen that the cooperative relationship between the generally planar members 44, 52, 58 with the slots in the first members 36 and the second members 38, 46 and 56 provides a strong construction which may be rapidly assembled.

The invention has been described with reference to its illustrated preferred embodiment. Persons skilled in the art of constructing display apparatus may, upon exposure to the teachings herein, conceive variations in the mechanical development of the components therein. Such variations are deemed to be encompassed by the disclosure, the invention being delimited only by the appended claims.

The inventor claims:

1. A modular display apparatus which comprises:
   at least one module which includes at least four elongated first members which are disposed in generally parallel spaced relationship;
   two of said first members intersecting a first plane along substantially the entire axial extent thereof, two other of said first members intersecting a second plane along substantially the entire extent thereof, the first and second planes being spaced;
   four elongated second members which are disposed in generally parallel relationship, two of said second members being disposed in generally perpendicular relationship to two of said first members and intersecting the first plane along substantially the entire axial extent thereof, two other of said second members being disposed in generally perpendicular relationship to two other of said first members and intersecting the second plane along substantially the entire axial extent thereof;
   each of said first members and each of said second members having a first slot disposed in a third plane which is generally perpendicular to the first and second planes;
   each of said first and second members including a second slot which is disposed in a fourth plane which is disposed in generally perpendicular relationship to the first and second planes;
   a first generally planar member carried in said first slots of said first and second elongated members; and
   a second generally planar member carried in said second slots of said first and second elongated members.

2. The apparatus as described in claim 1, wherein:
   said second elongated members are step shaped and have a dimension at the axial extremities measured in a direction parallel to the third and fourth planes which is smaller than the axial portions thereof intermediate the axial extremities.

3. The apparatus as described in claim 2, wherein:
   said first slots extend completely through the axial extremities of said second elongated members.

4. The apparatus as described in claim 3, wherein:
   said second slots extend completely through the axial extremities of said second elongated members.

5. The apparatus as described in claim 1, further including:
   a second module which includes at least four elongated first members which are disposed in generally parallel spaced relationship;
   two of said first members intersecting a first plane along substantially the entire axial extent thereof, two other of said first members intersecting a second plane along substantially the entire extent thereof, said first and second planes being spaced;
   four elongated second members which are disposed in generally parallel relationship, two of said second members being disposed in generally perpendicular relationship to two of said first members and intersecting the first plane along substantially the entire axial extent thereof, two other of said second members being disposed in generally perpendicular relationship to two other of said first members and intersecting the second plane along substantially the entire axial extent thereof;
   each of said first members and each of said second members having a first slot disposed in a third plane which is generally perpendicular to the first and second planes;

each of said first and second members including a second slot which is disposed in a fourth plane which is disposed in generally perpendicular relationship to the first and second planes;

a first generally planar member carried in said first slots of said first and second elongated members; and a second generally planar member carried in said second slots of said first and second elongated members.

6. The apparatus as described in claim 5, wherein:
said second elongated members in said second module are step shaped and have a dimension at the axial extremities measured in a direction parallel to said third and fourth planes which is smaller than the axial portions thereof intermediate the axial extremities.

7. The apparatus as described in claim 6, wherein:
said first slots in said second module extend completely through the axial extremities of said second elongated members.

8. The apparatus as described in claim 7, wherein:
said second slots of said second module extend completely through the axial extremities of said second elongated members.

9. The apparatus as described in claim 5 or 8, wherein:
said first and second modules are joined by cooperating elongated first and second surfaces disposed respectively on said first and second modules.

10. The apparatus as described in claim 9, wherein:
said first surface is a tongue and said second surface is a groove dimensioned for engagement with said tongue.

11. The apparatus as described in claim 5 or 8, wherein:
said first and second modules are hinged together by at least one hinge having a hinge pin having an axis which is disposed in generally parallel relationship to the first and second planes of the first module.

12. The apparatus as described in claim 5 or 8, wherein:
said apparatus further includes a third generally planar member and a plurality of third notches cut in said first and second members which extend through a generally planar member which is generally parallel to said first and second generally planar members.

13. The apparatus as described in claims 1, 5, or 8, wherein:
said apparatus further includes casters mounted on the lower extremity thereof.

* * * * *